United States Patent
Eggers et al.

(10) Patent No.: US 9,639,816 B2
(45) Date of Patent: May 2, 2017

(54) IDENTIFYING PEOPLE LIKELY TO RESPOND ACCURATELY TO SURVEY QUESTIONS

(71) Applicant: Lightspeed, LLC, Warren, NJ (US)

(72) Inventors: Mitchell Eggers, Mercer Island, WA (US); Eli Drake, Seattle, WA (US)

(73) Assignee: Lightspeed, LLC, Warren, NJ (US)

( * ) Notice: Subject to any disclaimer, the term of this patent is extended or adjusted under 35 U.S.C. 154(b) by 0 days.

(21) Appl. No.: 13/662,347

(22) Filed: Oct. 26, 2012

(65) Prior Publication Data

US 2013/0110584 A1    May 2, 2013

Related U.S. Application Data

(60) Provisional application No. 61/552,912, filed on Oct. 28, 2011.

(51) Int. Cl.
| | | |
|---|---|---|
| *G06Q 10/00* | (2012.01) | |
| *G06Q 30/00* | (2012.01) | |
| *G06Q 10/06* | (2012.01) | |
| *G06Q 30/02* | (2012.01) | |

(52) U.S. Cl.
CPC ......... *G06Q 10/06* (2013.01); *G06Q 30/0203* (2013.01)

(58) Field of Classification Search
CPC ............ G06Q 10/00–50/00; G06F 1/00–21/00
See application file for complete search history.

(56) References Cited

U.S. PATENT DOCUMENTS

| | | | |
|---|---|---|---|
| 5,406,956 A * | 4/1995 | Farwell ................. | 600/544 |
| 6,161,059 A * | 12/2000 | Tedesco et al. ........ | 700/232 |
| 6,535,819 B1 * | 3/2003 | Clark ..................... | 702/19 |
| 6,895,405 B1 * | 5/2005 | Choi et al. | |
| 6,928,434 B1 * | 8/2005 | Choi et al. | |
| 6,996,560 B1 * | 2/2006 | Choi et al. | |

(Continued)

FOREIGN PATENT DOCUMENTS

| | | |
|---|---|---|
| EP | 1653379 | 5/2006 |
| KR | 10-2001-0007928 | 2/2001 |

(Continued)

OTHER PUBLICATIONS

Hodge, Victoria J., and Jim Austin. "A survey of outlier detection methodologies." Artificial intelligence review 22.2 (2004): 85-126.*

(Continued)

*Primary Examiner* — Alan S Miller
(74) *Attorney, Agent, or Firm* — Perkins Coie LLP

(57) ABSTRACT

A survey data structure is described that specifies how to administer a survey to each of a group of people. The data structure contains an entry that specifies text that poses a fabrication gauge question for which a percentage of the population who can accurately answer the fabrication gauge question affirmatively is known. The data structure further contains a plurality of entries that each specify text posing an unlikely question for which the percentage of the population who can accurately answer the unlikely question affirmatively is small. The data structure specifies how to conduct a survey that serves as a basis for determining which people to whom the survey is administered are responding truthfully to the survey.

14 Claims, 6 Drawing Sheets

(56) References Cited

U.S. PATENT DOCUMENTS

| | | | |
|---|---|---|---|
| 6,999,987 B1* | 2/2006 | Billingsley et al. | 709/203 |
| 7,191,144 B2* | 3/2007 | White | 705/7.32 |
| 7,398,270 B1* | 7/2008 | Choi et al. | |
| 7,418,496 B2* | 8/2008 | Macey et al. | 709/224 |
| 7,769,627 B2* | 8/2010 | Sabharwal et al. | 705/7.32 |
| 7,873,589 B2* | 1/2011 | Shiffman et al. | 706/47 |
| 8,175,903 B2* | 5/2012 | Brierley et al. | 705/7.11 |
| 8,396,718 B2* | 3/2013 | Au et al. | 705/1.1 |
| 8,583,568 B2* | 11/2013 | Garland et al. | 706/12 |
| 2002/0035486 A1* | 3/2002 | Huyn et al. | 705/3 |
| 2004/0093261 A1* | 5/2004 | Jain et al. | 705/10 |
| 2004/0210471 A1* | 10/2004 | Luby et al. | 705/10 |
| 2005/0071219 A1* | 3/2005 | Kahlert et al. | 705/10 |
| 2006/0136283 A1* | 6/2006 | Sabharwal et al. | 705/10 |
| 2007/0048718 A1* | 3/2007 | Gruenstein | 434/322 |
| 2008/0091510 A1* | 4/2008 | Crandall et al. | 705/10 |
| 2009/0055245 A1* | 2/2009 | Bostock et al. | 705/10 |
| 2009/0319332 A1* | 12/2009 | Au et al. | 705/10 |
| 2010/0114666 A1* | 5/2010 | Brierley et al. | 705/10 |
| 2010/0241573 A1* | 9/2010 | Joa et al. | 705/80 |
| 2011/0145043 A1* | 6/2011 | Handel | 705/14.2 |
| 2011/0191141 A1* | 8/2011 | Thompson et al. | 705/7.32 |
| 2011/0264617 A1* | 10/2011 | Eggers et al. | 706/50 |
| 2012/0084120 A1* | 4/2012 | Hirsch et al. | 705/7.32 |
| 2013/0054497 A1* | 2/2013 | Garland et al. | 706/12 |
| 2013/0054559 A1* | 2/2013 | Pettit | 707/709 |

FOREIGN PATENT DOCUMENTS

| | | |
|---|---|---|
| KR | 10-2004-0068743 | 8/2004 |
| WO | WO-2007-032692 | 3/2007 |

OTHER PUBLICATIONS

Downs, Julie S., et al. "Are your participants gaming the system?: screening mechanical turk workers." Proceedings of the SIGCHI Conference on Human Factors in Computing Systems. ACM, 2010.*

International Search Report, PCT Application PCT/US12/062300, Mar. 12, 2013, 10 pgs.

* cited by examiner

1. Which of the following statements are true for you?

Yes No

☐ ☐ a. I have a hunting license. — 401
☐ ☐ b. I have a subscription to the opera. — 402
☐ ☐ c. I have a driver's license. — 403
☐ ☐ d. I have ridden a unicycle more than 100 yards. — 404
☐ ☐ e. I have more than 3 dogs as pets. — 405
☐ ☐ f. I was born in November. — 406
☐ ☐ g. I have attended a live jazz concert in the past 3 months. — 407
☐ ☐ h. I have operated a chain saw in the past 12 months. — 408

*FIG. 4*

FIG. 6 — survey response table 600

| respondent id | question number / question type | 1a unlikely | 1b unlikely | 1c dummy | 1d unlikely | 1e unlikely | 1f fabrication gauge | 1g unlikely | 1h unlikely | 2 substantive | ... | total unlikely |
|---|---|---|---|---|---|---|---|---|---|---|---|---|
| 12990130 | | yes | yes | yes | yes | yes | yes | yes | yes | 46 | | 6 |
| 54646581 | | no | yes | yes | no | no | no | yes | no | 18 | | 2 |
| 45646546 | | no | no | yes | no | no | yes | no | yes | 35 | | 1 |
| 89740012 | | no | no | yes | yes | no | no | no | no | 23 | | 0 |
| 54318764 | | no | no | yes | no | yes | no | no | no | 25 | | 1 |
| 90780654 | | no | no | yes | no | no | no | no | no | 71 | | 0 |
| 34347083 | | yes | yes | yes | no | yes | yes | yes | yes | 23 | | 4 |
| 65412785 | | no | no | yes | no | no | no | yes | no | 54 | | 1 |
| 94608450 | | yes | yes | yes | no | yes | yes | no | yes | 28 | | 5 |
| 56498416 | | yes | no | yes | no | yes | yes | no | yes | 34 | | 3 |
| 54649813 | | no | no | yes | no | no | no | no | no | 31 | | 0 |
| 79050221 | | no | no | yes | no | no | no | no | no | 29 | | 0 |
| 46742499 | | no | no | no | no | no | no | no | no | 22 | | 0 |
| 73963545 | | no | no | no | no | no | no | no | no | 34 | | 0 |
| 82004786 | | no | no | no | no | no | no | no | no | 19 | | 0 |
| 32259834 | | no | no | no | yes | no | no | no | no | 44 | | 1 |

651 — 652 — 653 — 654 — 655 — 656 — 657 — 658 — 659 — 660 — 661

601–616: column reference numerals

`US 9,639,816 B2`

IDENTIFYING PEOPLE LIKELY TO RESPOND ACCURATELY TO SURVEY QUESTIONS

CROSS-REFERENCE TO RELATED APPLICATION(S)

The applicants hereby claim the benefit of U.S. Provisional Patent Application No. 61/552,912 filed on Oct. 28, 2011, which is hereby incorporated by reference in its entirety.

BACKGROUND

In a survey, a group of questions is posed to each of a number of different survey participants, and the answers provided by the survey participants are noted. In some cases, the results of a survey are used merely to understand the views of the survey participants themselves, while in others, the results are attributed to one or more larger groups of which the survey participants are believed to be representative.

BRIEF DESCRIPTION OF THE DRAWINGS

FIG. 4 is a user interface diagram showing a sample display presented by the facility in some embodiments to pose fabrication gauge, unlikely, and likely survey questions.

FIG. 6 is a data structure diagram showing sample contents of a typical survey response table used by the facility in some embodiments to store survey responses.

DETAILED DESCRIPTION

Figure 1:
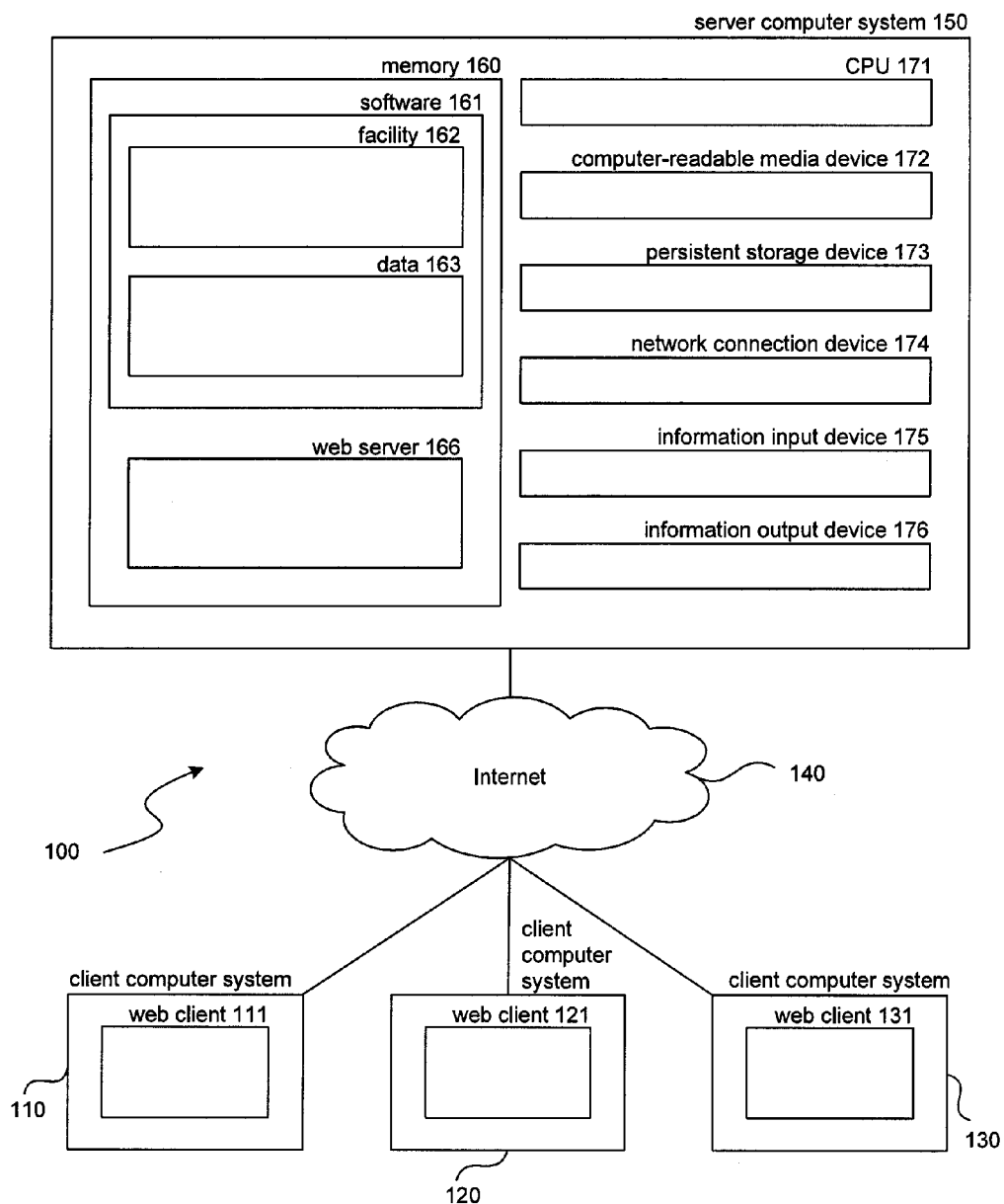
FIG. 1 is a high-level block diagram showing a typical environment in which a software, hardware, and/or firmware facility implementing the functionality described herein operates in some embodiments.

The inventors have observed in conducting surveys that some survey participants respond inaccurately to survey questions, in some cases to qualify for some compensation provided in exchange for participating in the survey, or because responding to the survey inaccurately can be done in less time than responding to the survey accurately. The inventors have determined that such inaccurate responses tend to make survey results less useful and valuable. Accordingly, the inventors have developed a software and/or hardware facility for identifying people likely to respond accurately to survey questions ("the facility").

The facility poses a small set of qualification questions to an assembled group of prospective survey respondents. These qualification questions may either be posed to respondents as part of the survey that contains substantive survey questions, or as part of a "pre-survey" that a respondent completes before having an opportunity to participate in the main survey, or as part of a respondent router that assess honesty while also assessing which of a multiple of studies a respondent will qualify to complete. The set of qualification questions include a number of "unlikely" questions for each of which the correct answer is YES for a small percentage of the population, such as "Do you have more than 3 dogs as pets?" These "unlikely"—or low-incidence—questions should have low correlation, i.e., an accurate YES answer to one of the "unlikely" questions doesn't make more likely an accurate YES answer to any of the other "unlikely" questions. The set of qualification questions also includes one or more "fabrication gauge" questions for which a reliable percentage of the population is known for whom the correct answer is YES, such as "Were you born in the month of September?" The rate by which the YES answers to the "fabrication gauge" questions exceed the expected percentage provides an approximation of the portion of the group that is likely lying in an attempt to qualify for the survey, as participants may perceive that YES answers are more likely to result in their qualification for a survey. The facility discards people from the group in decreasing order of the number of "unlikely" questions to which they answered YES until the expected percentage of remaining undiscarded people answer YES to the fabrication gauge question. The people who remain in the group after this discarding are regarded by the facility as likely to respond accurately to survey questions. In some embodiments, the facility stores an indication that the remaining people are likely to respond accurately to survey questions. In some embodiments, the facility reports the survey responses of the remaining people in the group as the results of the survey come to the exclusion of the survey responses by people who do not remain in the group.

By behaving in some or all of these ways, the facility enables the operator of a survey to reduce the influence on survey results of inattentive, under-considered, malicious, or otherwise inaccurate survey responses.

FIG. 1 is a high-level block diagram showing a typical environment in which a software, hardware, and/or firmware facility implementing the functionality described herein operates in some embodiments. The environment 100 includes a server computer system 150. The server computer system 150 includes a memory 160. The memory 160 includes software 161 incorporating both the facility 162 and data 163 typically used by facility. The memory further includes a web server computer program 166 for providing web pages and/or other information to other computers. While items 162 and 163 are stored in memory while being used, those skilled in the art will appreciate that these items, or portions of them, maybe be transferred between memory and a persistent storage device 173 for purposes of memory management, data integrity, and/or other purposes. The server computer system 150 further includes one or more central processing units (CPU) 171 for executing programs, such as programs 161, 162, and 166, and a computer-readable medium drive 172 for reading information or installing programs such as the facility from tangible computer-readable storage media, such as a floppy disk, a CD-ROM, a DVD, a USB flash drive, and/or other tangible computer-readable storage media. The computer system 150 also includes one or more of the following: a network connection device 174 for connecting to a network (for example, the Internet 140), an information input device 175, and an information output device 176. In some embodiments, the facility operates on the server computer system to perform some or all of the following activities: designing a survey; administering a survey; identifying survey responses that are unlikely to have been prepared accurately; and/or compiling survey responses.

The block diagram also illustrates several client computer systems, such as client computer systems 110, 120, and 130. Each of the client computer systems includes a web client computer program, such as web clients 111, 120, and 131, for receiving web pages and/or other information in response to requests to web server computer programs, such as web server computer program 166. The client computer systems are connected via the Internet 140 or a data transmission network of another type to the server computer system 150. Those skilled in the art will recognize that the client computer systems could be connected to the server computer system 150 by networks other than the Internet, however. In some embodiments, some or all of the client computer systems are used to complete a survey. In some embodiments, these client computer systems can include other server computer systems, desktop computer systems, laptop computer systems, mobile phones, personal digital assistants, tablet computers, televisions, cameras, automobile computers, electronic media players, etc.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

Figure 2:
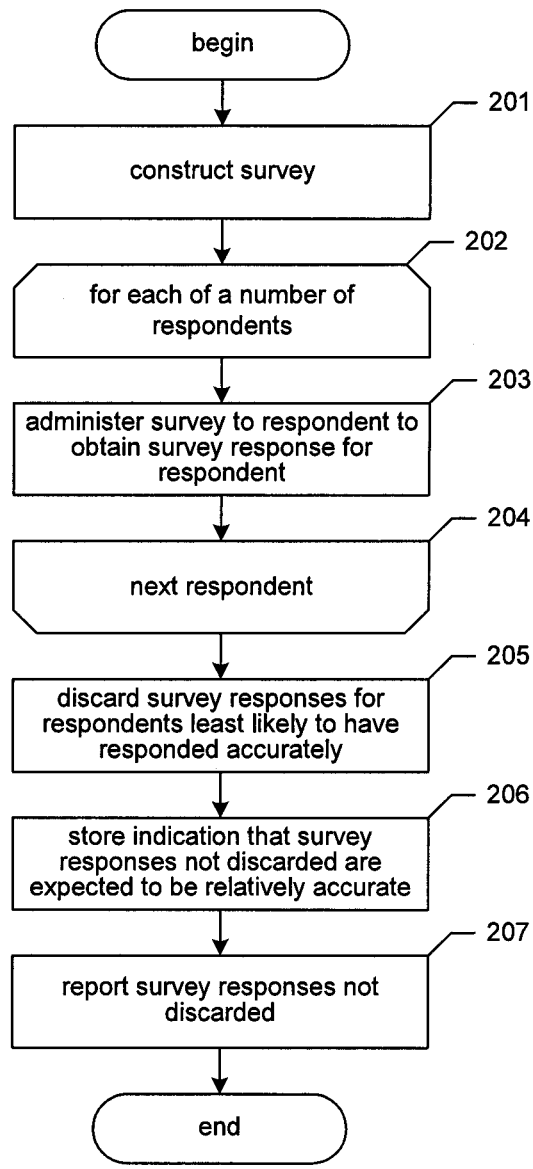
FIG. 2 is a flow diagram showing steps typically performed by the facility in some embodiments in order to identify people likely to have responded accurately to survey questions.

FIG. 2 is a flow diagram showing steps typically performed by the facility in some embodiments in order to identify people likely to have responded accurately to survey questions. In step 201, the facility constructs a survey. The facility's performance of step 201 is discussed in greater detail below in connection with FIG. 3.

Figure 3:
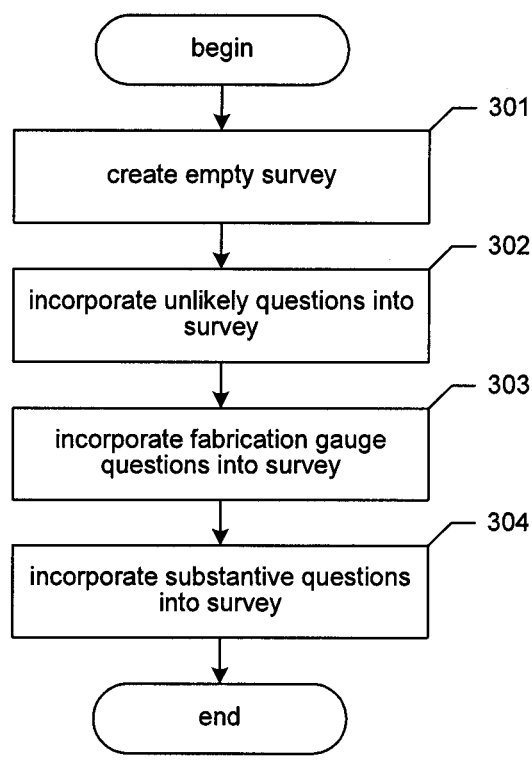
FIG. 3 is a flow diagram showing steps typically performed by the facility in some embodiments in order to construct a survey.

FIG. 3 is a flow diagram showing steps typically performed by the facility in some embodiments in order to construct a survey. In step 301, the facility creates an empty survey containing no questions. In some embodiments, rather than creating an empty survey in step 301, the facility uses a template containing certain common elements, such as boilerplate questions, formatting or other design elements, disclaimers and/or privacy policies, etc. (not shown). In step 302, the facility incorporates into the created survey a number of unlikely questions. These are questions that would each be accurately answered YES by a small percentage of the population, and that have low correlation. As one example, in some embodiments, the facility includes the unlikely questions shown below in Table 1, and/or similar questions.

TABLE 1

I have a hunting license.
I have a subscription to the opera.
I have written a unicycle more than 100 yards in the last 12 months.
I have 3 or more dogs as pets.
I have attended a live jazz concert in the last 3 months.
I have operated a chain saw in the past 12 months.

In some embodiments (not shown), to add diversity, one or more likely questions is included among the unlikely questions and the answers to these questions are ignored. An example likely question is "I have a driver's license."

In step 303, the facility incorporates into the survey a fabrication gauge question for which a reliable percentage of the population is known who will accurately answer YES. One example is "I was born in November," a fabrication gauge question to which $1/12$ of respondents would be expected to accurately answer YES. Any other month may be used, as may zodiac birth signs, Asian animal birth years, month of birth of ones mother or father, left- or right-handedness, eye color, etc. In some embodiments, the facility uses an expected percentage of affirmative answers for a fabrication gauge question that is matched to the population expected to take the survey. In various embodiments, the facility incorporates various numbers of fabrication gauge questions into the survey.

In step 304, the facility incorporates substantive questions into the survey that seek the information that is the subject of the survey. These questions may be intended to obtain information from the respondent that is useful in its own right, or may be used to "route" the respondent to one or more surveys for which the respondent is qualified. After step 304, these steps conclude.

Those skilled in the art will appreciate that the steps shown in FIG. 3 and in each of the flow diagrams discussed below may be altered in a variety of ways. For example, the order of the steps may be rearranged; some steps may be performed in parallel; shown steps may be omitted, or other steps may be included; a shown step may be divided into sub-steps, or multiple shown steps may be combined into a single step, etc.

Returning to FIG. 2, in steps 202-204, the facility loops through each of a number of respondents. In step 203, the facility administers the survey constructed in step 201 to the respondent to obtain a survey response for the respondent. In general, the survey response for a respondent contains or otherwise identifies the answers specified by the respondent in response to each question posed in the survey. In some embodiments, the survey may have survey flow logic that prevents all of the questions of the survey from being posed to a respondent, and thus the respondent's response does not identify an answer for that question. The survey may be administered to the respondent in series, in parallel, via the web or another client-server computer arrangement, using a monolithic computer system, or manually, such as by telephone, handwriting, scantron bubble forms, etc.

FIG. 4 is a user interface diagram showing a sample display presented by the facility in some embodiments to pose fabrication gauge, unlikely, and likely survey questions. The display 400 includes a compound question asking which of eight statements are true for the respondent. Question 406 is a fabrication gauge question; questions 401, 402, 404, 405, 407 and 408 are unlikely questions; and question 403 is a likely question. The respondent selects next to each question the YES or NO checkbox that contains the appropriate answer to the question. In some cases, respondents wishing not to be disqualified for the survey may check many or all of the YES boxes in an attempt to avoid disqualification. They may do so, for example, in order to obtain various kinds of compensation provided to respondents who are not disqualified from a survey; have a full opportunity to express their views and have them considered by decision-makers; etc.

Returning to FIG. 2, in step 204, if additional respondents remain to take the survey, then the facility continues in step 202 to administer the survey to the next respondent.

In step 205, the facility discards survey responses for respondents that are least likely to have responded accurately to the survey. The facility's performance of step 205 is discussed in greater detail below in connection with FIG. 5. If the lie detector is in a separate pre-qualification, those who failed the lie detector will not be routed to market research studies.

Figure 5:
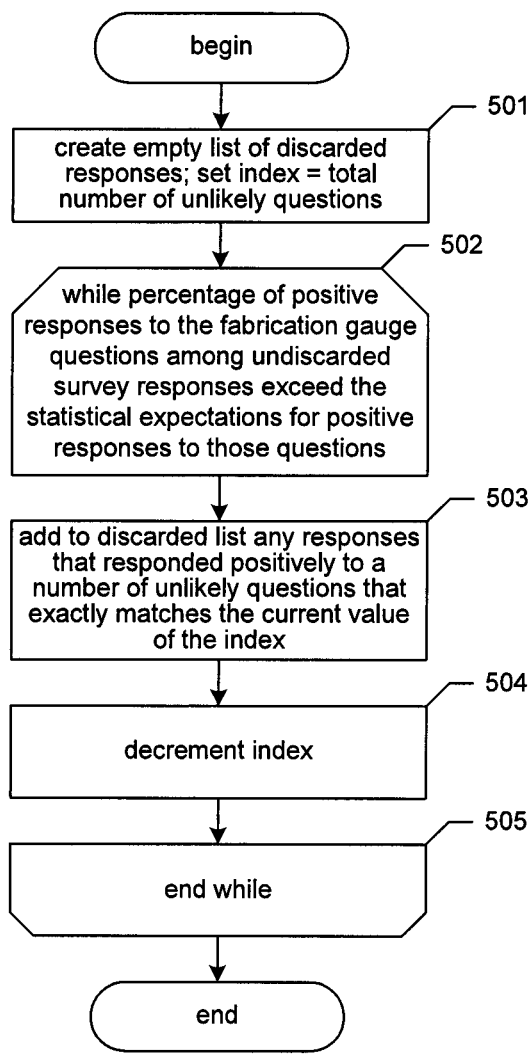
FIG. 5 is a flow diagram showing steps typically performed by the facility in order to discard survey responses for respondents least likely to have responded accurately to the survey.

FIG. 5 is a flow diagram showing steps typically performed by the facility in order to discard survey responses for respondents least likely to have responded accurately to the survey.

In step 501, the facility creates an empty list of discarded responses and sets the value of index to the total number of unlikely questions included in the survey, which is six in the example. The facility continues to loop through steps 502-505 while the percentage of positive responses to the fabrication gauge question or questions among survey responses that have not been discarded in step 503 below exceeds the statistical expectations for positive responses to those fabrication gauge questions. In the example depicted above, there is one fabrication gauge question, asking whether it is true that "I was born in November." The facility attributes a 1/12 or 8.33% statistical expectation for positive responses to these questions. Where four of sixteen or 25% of respondents answer affirmatively to this question, the percentage of positive responses to the fabrication gauge questions among undiscarded survey responses initially exceeds statistical expectations by 16.67%.

In step 503, the facility adds to the list of discarded responses any responses that respond positively to a number of unlikely questions that exactly matches the current value of the index. In step 504, the facility decrements the index. In step 505, if the percentage of positive responses to the fabrication gauge questions among undiscarded survey responses still exceeds the statistical expectations for positive responses to those fabrication gauge questions, then the facility continues in step 502 to perform another iteration of steps 502-505. After step 505, these steps conclude. A detailed example of how responses are discarded is discussed below in connection with FIG. 6.

FIG. 6 is a data structure diagram showing sample contents of a typical survey response table used by the facility in some embodiments to store survey responses. The table 600 is made up of a number of rows 601-616 each corresponding to a person who completed the survey. Each row is divided into the following columns: a respondent id column 651 containing an identifier that identifies the respondent to which the row corresponds; unlikely question answer columns 652, 653, 655, 656, 658, and 659, each indicating the answer the respondent gave to an unlikely question; a dummy question column 654 indicating the respondent's answer to a likely or "dummy" question included in the survey; a fabrication gauge question answer column 657 indicating the answer given by the respondent to the fabrication gauge question; one or more substantive question answer columns 660 each indicating the respondent's answer to one of the substantive questions of the survey; and a total unlikely column 661 containing a count of the total number of affirmative answers given by the respondent to unlikely questions. For example, row 601 indicates that the respondent having respondent id 12990130 answered YES to unlikely question 1a, YES to unlikely question 1b, YES to dummy question 1c, YES to unlikely question 1d, YES to unlikely question 1e, YES to fabrication gauge question 1f, YES to unlikely question 1g, YES to unlikely question 1h, and 46 to substantive question 2, and that the total number of affirmative answers to unlikely questions given by this respondent is 6.

While FIG. 6 shows a table whose contents and organization are designed to make it more comprehensible by a human reader, those skilled in the art will appreciate that actual data structure used by the facility to store this information may differ from the table shown, in that it, for example, may be organized in a different manner; may contain more or less information than shown; may be compressed and/or encrypted; may contain a much larger number of rows and/or columns than shown; etc.

In some embodiments, the facility discards responses in the example shown in FIG. 6 as shown in Table 2 below.

| loop iteration | index value | rows discarded | undiscarded YES responses | total undiscarded responses | undiscarded YES percentage |
|---|---|---|---|---|---|
| 1 | 6 | 601 | 3 | 15 | 20% |
| 2 | 5 | 609 | 2 | 14 | 14.29% |
| 3 | 4 | 607 | 2 | 13 | 15.38% |
| 4 | 3 | 610 | 1 | 12 | 8.33% |

As a result, the responses corresponding to rows 601, 607, 609, and 610 are included in the discarded list.

Returning to FIG. 2, in step 206, the facility stores an indication that the survey responses not discarded is expected to be relatively accurate. In various embodiments, this involves storing an indication in the rows of the discarded responses that they have been discarded; storing an indication in the rows not discarded that they were not discarded; constructing a list of discarded responses; constructing a list of responses not discarded, etc.

In step 207, the facility reports the survey responses that were not discarded as the survey's result. In general, this involves reporting contents of substantive question columns of the table for rows not discarded, to the exclusion of the discarded rows. For example, if a substantive question 2 asks the respondent's age, then a survey result may be reported for this column that averages the answers to this question contained in non-discarded rows, that is, rows 602-606, 608, and 611-616, or 18, 35, 23, 25, 71, 54, 31, 29, 22, 34, 19, and 44 for an average of 33.75. Those skilled in the art will recognize that a variety of other approaches to reporting survey results in light of responses discarded may be employed.

The inventors have noted a variety of other factors that tend to predict that a person will respond inaccurately to a survey, such as a large number of surveys previously completed, large incentives for completing a survey, and cultural factors. In various embodiments, the facility combines different factors as part of selecting the survey responses to discard.

In addition, in some embodiments, the facility performs post lie detection validation testing using the methods described in U.S. patent application Ser. No. 12/764,838 filed on Apr. 21, 2010, which is hereby incorporated by reference in its entirety. In some embodiments, the facility uses the described techniques to compare two multi-dimensional data sets—one with those who failed the honesty test and one with those who passed it—to create post hoc a "lie detector." In this approach, the facility uses previously claimed questions from "The Standard" along with a couple of low incidence questions. People who fail these questions are generally outliers ("outliars") from the entire data set. The facility determines that their answers to the standard calibration questions don't fit the expected structure of the data set as a whole. The facility does this by calculating a forest on the calibration study (by creating a series of trees that predict each variable from every other variable, and removing the lie detector variables to avoid any problems of independence) and then calculating the proximity matrix (the number of times each pair of panelists is classified in the same node) and matching low proximity panelists, i.e. the panelists that don't look like any other panelists, with the number of low incidence questions that they answered positively.

In some embodiments, the facility uses high-incidence questions in place of some or all of the above-described low-incidence questions, and treats a NO answer to these as an aberrant answer, as contrasted with treating YES answers to low-incidence questions as aberrant answers. For example, in some embodiments, the facility uses the following high-incidence question, to which a NO answer is treated as aberrant: "Please answer yes or no: I have not purchased a minivan within the past two weeks."

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system, having a processor and memory, comprising:
   causing by the computing system to be presented via a network connection device to each of a plurality of people:
      a plurality of unlikely questions, each of whose affirmative answer is accurate for only a small percentage of the population,
      a fabrication gauge question whose affirmative answer is accurate for a known percentage of the population regardless of whether it is answered accurately by people to whom it is posed, and
      at least one substantive question;
   accessing, via the memory, a statistical expectation attributed to an affirmative answer to the fabrication gauge question;
   for each of the plurality of people:
      receiving, by the computing system, responses to the posed questions provided by the person;
      storing, in the memory, an identifier for the person among a set of person identifiers, the identifier associated with the responses;
   calculating, by the processor, a first percentage of the plurality of people who answered the fabrication gauge question in the affirmative;
   determining by the processor that the calculated first percentage exceeds the statistical expectation;
   determining, with the processor, for each person identifier, a number of unlikely questions to which the identified person answered affirmatively;
   with the processor, discarding person identifiers from the set of person identifiers by:
      (a) identifying, among the set of person identifiers, a proper subset associated with the largest number of unlikely questions answered affirmatively;
      (b) storing, in the memory, an indication to discard one or more of the person identifiers in the proper subset;
      (c) calculating a second percentage of people associated with undiscarded person identifiers who answered the fabrication gauge question in the affirmative; and
      (d) iteratively repeating (a)-(c) until the second percentage is within a predetermined range of the known percentage; and
   reporting answers to the at least one substantive question for only people among the plurality of people whose person identifiers are undiscarded.

2. The method of claim 1 wherein the unlikely questions and fabrication gauge questions are caused to be posed in the same survey with substantive questions to which the people's responses are sought.

3. The method of claim 1 wherein the unlikely questions and fabrication gauge questions are caused to be posed in same survey with routing questions for routing people to further surveys for which they are expected to qualify.

4. The method of claim 1 wherein the unlikely questions and fabrication gauge questions are caused to be posed in a separate survey from substantive questions to which the people's responses are sought.

5. The method of claim 1, further comprising causing to be posed to each of the plurality of people, together with the unlikely questions, at least one likely question, each of whose affirmative answer has a relatively high likelihood of being accurate.

6. A computer-readable storage device having contents adapted to cause a computing system having a processor to perform a method for analyzing survey responses, the computer-readable storage device not constituting a propagating signal per se, the method comprising:
   receiving a plurality of completed survey responses, each survey response being generated by a person and specifying an answer to each of a plurality of questions, the plurality of questions comprising a question of a first type and a plurality of questions of a second type, the question of the first type having a selected answer that is accurate for a known percentage of people, each of the questions of the second type having a typical answer and an atypical answer; and
   with the processor, of the survey responses completed, selecting a proper subset of the survey responses to discount such that (a) the number of undiscounted survey responses containing the selected answer to the first question divided by the total number of undiscounted survey responses bears a predetermined relationship to the known percentage, and (b) no survey response not selected specifies more atypical answers to questions of the second type than any selected survey response.

7. The computer-readable storage device of claim 6 wherein the plurality of questions further comprise a question of a third type having at least two answers,
   the method further comprising, for each of the answers to the question of the third type, counting the number of survey responses not selected that specified the answer to the question, to the exclusion of selected survey responses that specified the answer to the question.

8. The computer-readable storage device of claim 6 wherein the plurality of questions further comprise a question of a third type having a free-form answer,
   the method further comprising, for each of the answers to the question of the third type, compiling the free-form answers specified by the survey responses not selected in response to the question, to the exclusion of the free-form answers specified by the selected survey responses.

9. A computer-readable storage device storing a survey data structure specifying how to automatically administer a survey to each of a plurality of people, the computer-readable storage device not constituting a propagating signal per se, the data structure comprising:

an entry specifying the display of text posing a fabrication gauge question for which a percentage of the population who can accurately answer the fabrication gauge question affirmatively is known; and a plurality of entries each specifying the display of text posing an unlikely question for which a percentage of the population who can accurately answer the unlikely question affirmatively is small, such that the data structure specifies how to automatically conduct a survey that serves as a basis for determining which people to whom the survey is administered are responding truthfully to the survey.

10. The computer-readable storage medium of claim 9 wherein the entries further comprise at least one entry specifying text posing a substantive question whose answer is sought from the people.

11. A computer-readable storage device storing a survey response data structure specifying how each of a plurality of people have responded to a survey, the computer-readable storage device not constituting a propagating signal per se, the data structure comprising a plurality of entries each corresponding to a person who has responded to the survey, and each comprising:

a first component containing data indicating the person's response to a fabrication gauge question for which a percentage of the population who can accurately answer the fabrication gauge question affirmatively is known; and a plurality of second components each indicating the person's response to an unlikely question for which a percentage of the population who can accurately answer the unlikely question affirmatively is small, such that the data structure serves as a basis for automatically determining which of the people responded truthfully to the survey.

12. A computer-readable storage device storing an adjusted survey response data structure indicating results for a survey in which each of a plurality of people has responded to a plurality of questions, the computer-readable storage device not constituting a propagating signal per se, the data structure comprising a plurality of entries each corresponding to a person who has responded to the survey, and each comprising data that, for each of one or more substantive survey questions, indicates an answer given by the person to whom the entry corresponds in response to the substantive survey question, the data structure containing entries corresponding only to people determined, based at least in part on responses to a fabrication gauge question for which a percentage of the population who can accurately answer the fabrication gauge question affirmatively is known, and responses to a plurality of unlikely questions for which a percentage of the population who can accurately answer an unlikely question affirmatively is small, to be likely to have responded to the survey accurately, to the exclusion of people determined to be unlikely to have responded to the survey accurately, such that the contents of the data structure can be used to automatically determine answers given to substantive questions only by people determined to be likely to have responded to the survey accurately, to the exclusion of people determined to be unlikely to have responded to the survey accurately.

13. The computer-readable storage device of claim 6 wherein the predetermined relationship is that the number of undiscounted responses containing the selected answer to the question of the first type divided by the total number of undiscounted responses is equal to the known percentage.

14. The computer-readable storage device of claim 6 wherein the predetermined relationship is that the number of undiscounted responses containing the selected answer to the question of the first type divided by the total number of undiscounted responses is within a predetermined range of the known percentage.

* * * * *